US008526829B1

(12) United States Patent
Yap et al.

(10) Patent No.: US 8,526,829 B1
(45) Date of Patent: Sep. 3, 2013

(54) SYSTEM, METHOD AND APPARATUS FOR CLOCKLESS PPM OPTICAL COMMUNICATIONS

(75) Inventors: Daniel Yap, Newbury Park, CA (US);
Stanislav I Ionov, Calabasas, CA (US);
Irina Ionova, legal representative, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 308 days.

(21) Appl. No.: 12/868,378

(22) Filed: Aug. 25, 2010

Related U.S. Application Data

(60) Continuation-in-part of application No. 12/391,798, filed on Feb. 24, 2009, now abandoned, which is a division of application No. 10/973,696, filed on Oct. 25, 2004, now Pat. No. 7,515,835.

(51) Int. Cl.
*H04B 10/04* (2006.01)

(52) U.S. Cl.
USPC ........... 398/189; 398/202; 398/212; 398/161; 398/155; 398/158; 398/159; 398/154; 398/183; 398/188; 398/190; 398/191; 375/239; 375/238; 375/316; 375/286

(58) Field of Classification Search
USPC .............. 398/182, 183, 189, 186, 187, 188, 398/190, 191, 200, 201, 202, 208, 209, 210, 398/212, 211, 214, 154, 155, 158, 159, 160, 398/161, 146, 135, 136, 192, 193, 194, 207, 398/102, 75; 375/239, 238, 237, 292, 295, 375/316, 259, 286, 287
See application file for complete search history.

(56) References Cited

U.S. PATENT DOCUMENTS

| 5,172,258 A | 12/1992 | Verber |
| 5,208,455 A | 5/1993 | Nelson et al. |

(Continued)

FOREIGN PATENT DOCUMENTS

| EP | 0 521 671 A2 | 1/1993 |
| WO | 01/95526 A2 | 12/2001 |

OTHER PUBLICATIONS

Agraval, G.P., "Optical Solitons," Nonlinear Fiber Optics, Chapter Five, Academic Press, New York, pp. 133-152 (1995).

(Continued)

*Primary Examiner* — Hanh Phan
(74) *Attorney, Agent, or Firm* — George R. Rapacki; Daniel R. Allemeier

(57) ABSTRACT

A PPM transmitter includes an optical clock generator for generating equally-spaced optical pulses with a sampling period T; an encoder for transforming an incoming waveform U(t) into a linear combination V(t) of U(t) and a delayed output V(t−kT) according to a rule V(t)=U(t)+aV(t−kT), where k is a positive integer, V(t) is voltage generated by the encoder and a is a coefficient; and an optical delay generator for delaying optical pulses generated by the optical clock generator in proportion to the voltage V(t), such that $\Delta t_n = bV(t)$, where b is another coefficient and where $\Delta t_n$ is the amount of delay imposed by the optical delay generator. The PPM transmitter functions with a PPM receiver for communicating data without the need to transmit or otherwise provide a clock signal. The PPM receiver decodes an original series of the delayed optical pulses Q(t) and a second series Q(t−ckT) delayed by ckT where c is a coefficient.

8 Claims, 3 Drawing Sheets

(56) References Cited

U.S. PATENT DOCUMENTS

| | | | |
|---|---|---|---|
| 5,717,797 A | 2/1998 | Evans | |
| 6,424,773 B1 | 7/2002 | Watanabe | |
| 6,462,860 B1 | 10/2002 | Ionov | |
| 6,466,703 B1 | 10/2002 | Ionov | |
| 6,600,844 B2 | 7/2003 | Ionov | |
| 7,094,709 B2 | 8/2006 | Karkkainen | |
| 7,149,029 B1 | 12/2006 | Ionov | |
| 7,330,304 B2 | 2/2008 | Ionov | |
| 7,515,835 B1* | 4/2009 | Ionov | 398/191 |
| 2003/0219195 A1 | 11/2003 | Ionov | |
| 2004/0033019 A1 | 2/2004 | Lipson et al. | |
| 2005/0013543 A1 | 1/2005 | Ionov | |
| 2006/0002719 A1* | 1/2006 | Fuse | 398/189 |
| 2007/0092265 A1* | 4/2007 | Vrazel et al. | 398/189 |
| 2007/0110369 A1 | 5/2007 | Blauvelt et al. | |

OTHER PUBLICATIONS

Bigo, S., et al., "All-Optical Fiber Signal Processing and Regeneration for Soliton Communications," IEEE Journal of Selected Topics in Quantum Electronics, vol. 3, No. 5, pp. 1208-1222 (Oct. 1997).

Black, H.S., Modulation Theory, D. Van Nostrand Company, Inc., New York, pp. 283-298 (1953).

Diez, S., et al., "Gain-Transparent SOA-Switch for High-Bitrate OTDM Add/Drop Multiplexing," IEEE Photonics Technology Letters, vol. 11, No. 1, pp. 60-62 (Jan. 1999).

Haus, H.A., Waves and Fields in Optoelectronics, Prentice-Hall, Inc., Englewood Cliffs, New Jersey, pp. 216-220 (1984).

Petermann, K., "Basic Laser Characteristics," Laser Diode Modulation and Noise, Kluwer Academic Pubishers, Dordrecht/Boston/London, Chapter 2, pp. 4-59 (1988).

Schubert, C., et al., "160-Gb/s All Optical Demultiplexing Using a Gain-Transparent Ultrafast-Nonlinear Interferometer (GT-UNI)," IEEE Photonics Technology Letters, vol. 13, No. 5, pp. 475-477 (May 2001).

Schubert, C., et al., "Comparison of Interferometric All-Optical Switches for Demulitplexing Applications in High-Speed OTDM Systems," Journal of Lightwave Technology, vol. 20, No. 4, pp. 618-624 (Apr. 2002).

Wang, D., et al., \\Nonlinear Optical Loop Mirror Based n Standard Communication Fiber, Journal of Lightwave Technology, vol. 15, No. 4, pp. 642-646 (Apr. 1997).

U.S. Appl. No. 12/009,569 "Optical Pulse Delay Method and Apparatus", Oleg M. Efimov, et. al, Application & Office Actions, 2008.

* cited by examiner

SYSTEM, METHOD AND APPARATUS FOR CLOCKLESS PPM OPTICAL COMMUNICATIONS

RELATED APPLICATIONS

This application is a Continuation in Part of "System, Method and Apparatus for Clockless PPM Optical Communications" filed Feb. 24, 2009, application Ser. No. 12/391,798 by S. I. Ionov, which is a divisional of application Ser. No. 10/973,696 filed Oct. 25, 2004, now U.S. Pat. No. 7,515,835. The disclosure of each of the previously filed applications identified above is incorporated by reference.

TECHNICAL FIELD

This disclosure relates to clockless pulse position modulation (PPM) communication technology and particularly to optical clockless pulse position modulation communication technology.

BACKGROUND INFORMATION

Many satellite and terrestrial optical communication systems require transmission of analog signals. A straightforward way to address this need is to modulate the amplitude (AM) of an optical carrier. This approach, however, suffers from a poor Signal to Noise Ratio (SNR) at a distant receiver. It is well known that broadband modulation schemes, which utilize higher bandwidth than that of the transmitted waveform, may improve the SNR over that achieved with AM. Pulse position modulation (PPM) is one of such techniques. In PPM, a shift in the pulse position represents a sample of the transmitted waveform, as shown in FIG. 1. It can be shown that for a given power, $SNR_{PPM} \propto SNR_{AM}(t_p/t)^2$, where $t_p$ is the spacing between un-modulated pulses and t is the pulse duration, respectively. See H. S. Black, "Modulation Theory", D. Van Nostrand Co. (1953).

The implementations of PPM for optical communications require new techniques for generating trains of optical pulses whose positions are shifted in proportion to the amplitude of a transmitted waveform. A bandwidth of $\Delta f=1\text{-}10$ GHz and higher is of interest for future communications. Since pulse repetition frequencies (PRF) of $1/t_p > 2\Delta f$ are required for sampling a signal of bandwidth $\Delta f$, GHz trains of picosecond (ps) pulses may be required for realizing the advantages of PPM. For example, a free space optical link designed to transmit waveforms with $\Delta f=10$ GHz bandwidth requires sampling rates of $PRF=1/t_p \geq 2\Delta f=20$ GHz. By employing 1-2 ps-long optical pulses, a 30 dB gain is realized over an AM system with equal optical power.

Optical PPM offers large SNR improvements in power-starved optical links. This technology, however, requires development of new types of optical PPM receivers. The simplest and most basic PPM decoder, which is based on an integrating circuit, suffers from poor performance at low frequencies. See H. S. Black, "Modulation Theory", noted above. Though newly invented PPM decoders overcome the low-frequency shortcomings of the simplest decoder, these improvements come at the cost of higher complexity. See, for example, S. I. Ionov, "Detection of optical analog PPM streams based on coherent optical correlation", U.S. Pat. No. 6,462,860; S. I. Ionov, "A practical design of a PPM receiver with optical top hat pulse generator controlled by solitons", U.S. patent application Ser. No. 10/341,689 filed Jan. 13, 2003 which is based upon U.S. Ser. No. 60/383,343 filed May 23, 2002; I. Ionov "Method and Apparatus for PPM Demodulation Using A Semiconductor Optical Amplifier", U.S. Pat. No. 7,330,304 filed Nov. 3, 2003; I. Ionov, "Method and apparatus for optical top-hat pulse generation", U.S. patent application Ser. No. 10/735,071 filed Dec. 12, 2003 which is based upon U.S. Ser. No. 60/488,540 filed Jul. 18, 2003; and S. I. Ionov, "Interferometric PPM Demodulators based on Semiconductor Optical Amplifiers", U.S. Pat. No. 7,149,029 filed Jan. 11, 2005.

In the past, ElectroOptic delay generators shift the temporal position of an optical pulse in proportion to the applied voltage. Such a PPM modulator provides seamless means for a PPM encoding scheme wherein a temporal displacement of an optical pulse from its unmodulated position represents a sample of the transmitted waveform. Such an ElectroOptic delay generator has been described in: Method and apparatus for Electro-optic Delay Generation of Optical Signals U.S. Pat. No. 6,466,703 filed Apr. 7, 2000;

More recently, U.S. Pat. No. 7,330,304 demonstrated a PPM decoder based on the gain dynamics of a semiconductor optical amplifier. When fed by two optical streams—a PPM signal and clock, the decoder produces an electric output that is proportional to the delays between the corresponding signal and clock pulses and changes on the pulse-by-pulse scale.

A PPM communication system based on such an encoder and decoder requires optical clock pulses, which must be either transmitted alongside with the PPM signal or regenerated at the receiver side. This requirement puts an unnecessary burden on the communication system, which requirement is eliminated according to the present disclosure.

SUMMARY OF THE INVENTION

Referring to FIG. 1, a PPM Transmitter 100 includes an Optical Clock Generator 10 for generating equally-spaced optical pulses with a sampling period T; an Encoder 50 for transforming an incoming waveform U(t) into a linear combination V(t) of U(t) and a delayed output V(t−kT) according to a rule V(t)=U(t)+aV(t−kT), where k is a positive integer, V(t) is a voltage generated by the Encoder 50 and a is a coefficient. An Optical Delay Generator 20 delays optical pulses generated by the Optical Clock Generator 10 in proportion to the voltage V(t), such that $\Delta t_n = bV(t)$, where b is another coefficient and where $\Delta t$ is the amount of delay imposed by the Optical Delay Generator 20. The PPM Transmitter 100 generates a stream of optical pulses Q(t) from a clock signal internal to the Transmitter 100. However, the PPM Transmitter 100 functions with a PPM Receiver 200 for communicating data without the need to separately transmit a clock signal to the Receiver 200 or otherwise provide a separate clock signal at the Receiver 200.

The PPM Receiver 200 drives a PPM Decoder 40 with a received stream of optical pulses Q(t) and a version of Q(t) delayed by ckT in a Scaled Delay Module 30. The output of the PPM Decoder 40 is a voltage proportional to the input signal U(t).

DETAILED DESCRIPTION

Figure 1:
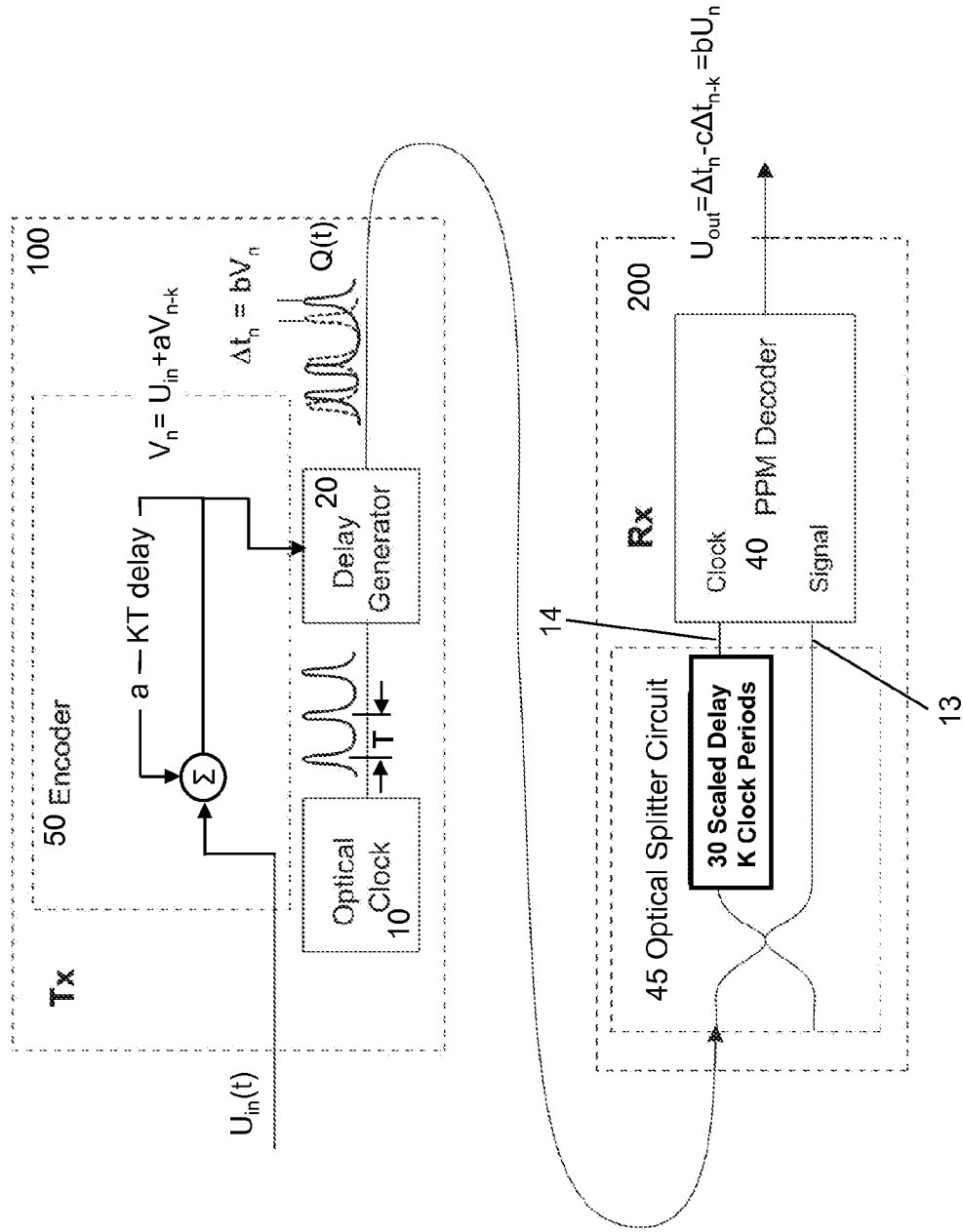
FIG. 1 shows the optical encoding/decoding scheme and required apparatus.

FIG. 1 shows the optical encoding/decoding scheme and required apparatus.

The scheme uses a well-known PPM format, wherein the input analog signal is encoded by a PPM Transmitter 100 in the temporal delay of samples of a periodic optical clock. The Receiver 200 decodes the received series of optical pulses.

The PPM Transmitter 100 consists of three major parts:
1. An Optical Clock Generator 10 that generates equally-spaced optical pulses with the sampling period T.
2. An Encoder 50 that transforms the incoming waveform $U_{in}(t)$ into a linear combination V(t) of $U_{in}(t)$ and a delayed output V(t−kT) according to the rule $$V(t)=U_{in}(t)+aV(t-kT), \qquad [\text{Eq. 1}]$$

where k is a positive integer, T is the sampling (i.e., optical clock) period and a is a coefficient.

3. A Optical Delay Generator 20 that delays the optical pulses supplied by the Optical Clock Generator 10 in proportion to the applied voltage V(t), i.e., $$\Delta t_n = bV(t) = bU_{in}(t) + abV(t-kT)), \qquad [\text{Eq. 2}]$$

where b is another coefficient.

The PPM Receiver 200 consists of:
1. An Optical Splitter Circuit that splits the incoming signal into two channels (signal and clock) and delays the latter by ck sampling periods in a Scaled Delay 30 module where c is another scale factor applied to $\Delta t_{n-k}$;
2. A PPM Decoder 40 that converts the delay between the two channels into an electrical waveform $$U_{out}(t)=\Delta t_n - c\Delta t_{n-k}=bU_{in}(t)+abV(t-kT))-cbV(t-kT)$$

$$U_{out}(t)=bU_{in}(t); \; c=a, \qquad [\text{Eq. 3}]$$

i.e., recovers the original waveform $U_{in}(t)$.

The Transmitter 100 in FIG. 1 comprises the Encoder 50, a Optical Clock Generator 10 and a Optical Delay Generator 20.

The Optical Clock Generator 10 in the PPM Transmitter 100 may be any commercially available source, e.g., an optical clock produced by Pritel Inc. or an ERGO pulse generating laser produced by GigaTerra.

An Electro-Optic delay generator has been described in: Method and apparatus for Electro-Optic Delay Generation of Optical Signals U.S. Pat. No. 6,466,703 filed Apr. 7, 2000; and Optical Pulse Delay Method and Apparatus U.S. patent application Ser. No. 12/009,569 filed Jan. 17, 2008 both of which are incorporated by reference in this application as though fully set forth.

In an embodiment of the Encoder circuit 50, the incoming signal $U_{in}(t)$ is directed to a device shown in block diagram form in FIG. 1. One embodiment for the Encoder circuit 50 may use a Digital Signal Processor. In an alternative embodiment, the Encoder circuit 50 may comprise a programmable digital computer. Alternatively, the Encoder circuit 50 may comprise discrete components as shown in System, Method and Apparatus for Clockless PPM Optical Communication by Ionov, U.S. Pat. No. 7,515,835 filed Oct. 25, 2004 and incorporated by reference. The round trip time of the signal in the Encoder's loop is chosen equal to kT, where T is the sampling (i.e., optical clock) period and k is an integer. The gain a must be less than one for a bounded V(t).

Figure 2:
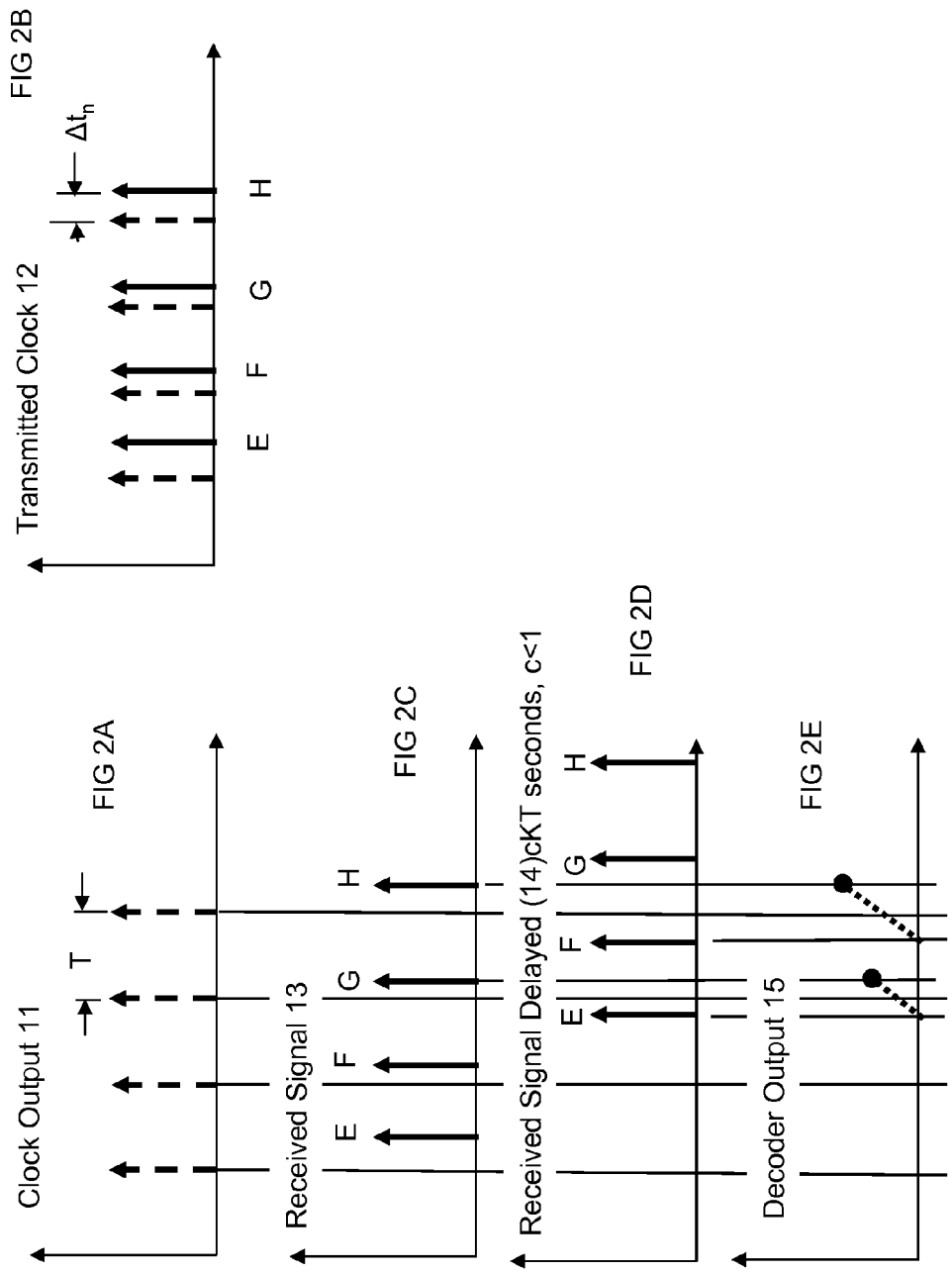
FIGS. 2A through 2E illustrate the operation of the invention.

FIGS. 2A through 2E explain the operation of this invention. FIG. 2A shows the output pulses 11 of an optical clock 10 with a period T. These pulses 11 are delayed in Optical Delay Generator 20 according to equation 1. The delayed clock pulses 12 are shown in FIG. 2B as the solid arrows and the delay Δt is relative to the clock pulse 11 shown as a dashed arrow for reference only. The set of pulses 12 in FIG. 2B are transmitted to the Receiver 200 and are shown in FIG. 2C as received signal 13. FIG. 2C is essentially a copy of the pulses in FIG. 2B. The received signal 13 of FIG. 2C is split and delayed in Optical Splitter Circuit 45 by kT periods and a bit less as set by the value c, as shown in FIG. 2D for the received signal delayed 14. In FIG. 2D k is two and c is less than one. The two signals, Received Signal 13 and Received Signal Delayed 14, go into a PPM Decoder 40 where the Received Signal 13 is connected to the signal input of the PPM Decoder 40 and the Received Signal Delayed 14 is connected to the clock input of the PPM Decoder 40. The operation of the PPM Decoder 40 is illustrated in the Decoder Output 15 of FIG. 2E. The decoder output is an electrical current or voltage that is proportional to the time between the arrival of the signal input and the arrival of the clock input. One consequence of this design is that the initial modulation Δt must be less than T/2 to preserve the order of comparison between the signal input and the clock input.

The PPM Receiver 200 is shown in FIG. 1 and comprises an Optical Splitter Circuit 45 and a PPM Decoder 40. The Optical Splitter Circuit 45 comprises an optical splitter and a Scaled Delay 30.

The Scaled Delay 30 in the PPM Receiver 200 can be assembled with standard Commercial Off the Shelf (COTS) components such as optical fiber or waveguide splitters and optical delay lines (adjustable or fixed).

Figure 3:
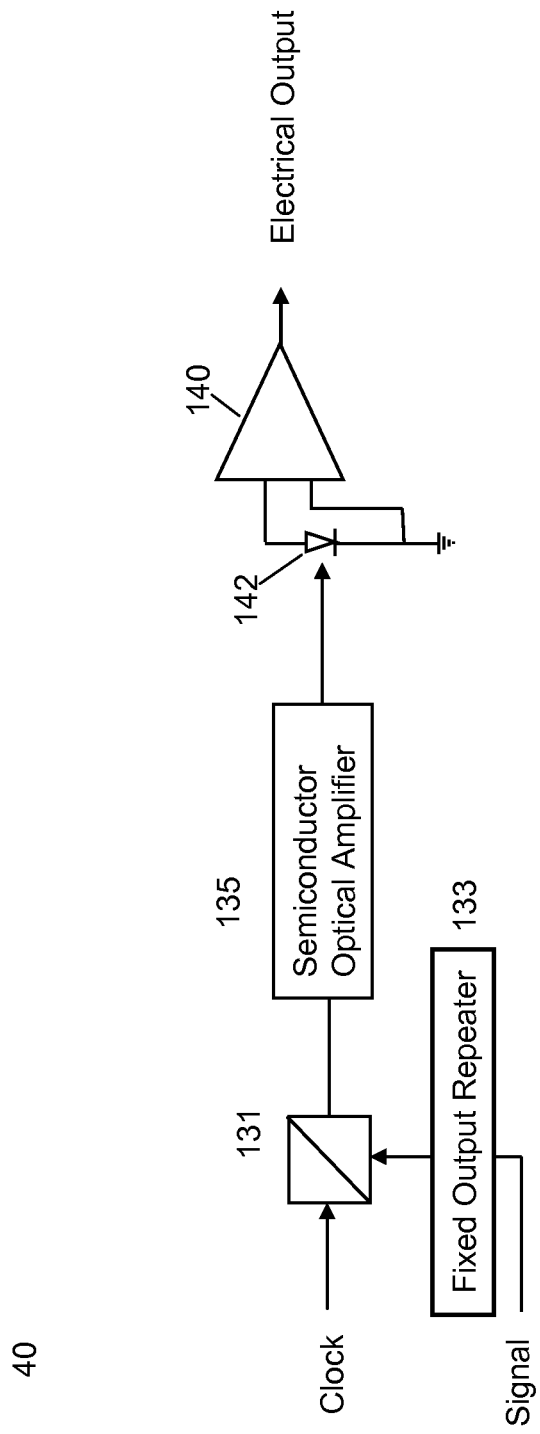
FIG. 3 shows an embodiment of one PPM demodulator suitable for the system described in FIG. 1.

FIG. 3 shows a basic PPM Decoder 40 based on a Semiconductor Optical Amplifier 135. The clock input and signal input are combined in the Combiner 131 and then directed to the Semiconductor Optical Amplifier (SOA) 135. The Semiconductor Optical Amplifier (SOA) 135 acts as a pulse-position to pulse-intensity converter as described in U.S. Pat. No. 7,330,304, filed Nov. 3, 2003 and incorporated by reference. One way for the SOA 135 to do this conversion is for each clock pulse to deplete the carrier-population and thus the gain of the SOA 135. The carrier population then recovers at a known rate after that clock pulse has ended because a continuous flow of carriers are supplied to the SOA 135 by means of the applied bias current. The gain experienced by the following position-modulated signal pulse provides a measure of the amount of gain recovery. Thus, the intensity of the amplified signal pulse is related to the time delay between that signal pulse and the preceding clock pulse. For the intensity of the amplified signal pulse to be proportional to the delay, the signal pulse input has to be stable (or at least its drift known) and have a well known amplitude. The output of the SOA 135 is in turn directed to a Photodetector 142 and Amplifier 140. Since the output of the SOA 135 has an optical amplitude proportional to the time delay between pulses and the Photodetector 142 converts the input optical signal into an electrical signal, the output of the Amplifier 144 is an electrical signal proportional to the time delay between pulses, ie, to the input analog signal.

In an alternative arrangement, the PPM Decoder 40 may further comprise a fixed output Repeater 133 that outputs a copy pulse at a known, stable amplitude when the input optical signal arrives such that the gain applied by the SOA can be calculated from the amplitude of the output of the SOA 135. Since the output of the SOA 135 depends solely on the gain and the gain depends only on the difference in arrival times of a clock pulse and a signal pulse, driving the Photodetector 142 with the output of the SOA 135 will produce an output proportional to the scaled value of the input $U_{in}(t)$.

From the foregoing description, it will be apparent to those skilled in the art that the present invention has a number of advantages, some of which have been described above, and others of which are inherent in the embodiments of the invention described herein. Also, it will be understood that modifications can be made to the disclosed apparatus described herein without departing from the teachings described herein. As such, the invention is not to be limited to the described embodiments except as required by the appended claims.

What is claimed is:

1. A pulse position modulation (PPM) optical communications system comprising:
 a transmitter comprising:
  an optical clock generator generating a series of periodic optical pulses of period T;
  an encoder that encodes an input signal U(t) into a series of delayed optical pulses Q(t) by delaying the periodic optical pulses by a delay $\Delta(t)=bV(t)$ according to $V(t)= U(t)+aV(t-kT)$, where k is a positive integer, a and b are coefficients;
 a receiver comprising:
  a splitter that receives the series of delayed optical pulses Q(t) then splits the received series of delayed optical pulses Q(t) into an original series and a second series;
  a delay module that delays the second series by ckT to produce, Q(t−ckT), wherein c is a positive coefficient;
  an optical pulse decoder receiving the Q(t) and Q(t−ckT); and
  a photodetector receiving an output of the optical pulse decoder;
  wherein the optical pulse decoder comprises a semiconductor optical amplifier.

2. The pulse position modulation (PPM) optical communications system of claim 1 wherein the receiver further comprises a fixed output repeater.

3. The pulse position modulation (PPM) optical communications system of claim 1 wherein the encoder is a digital signal processor.

4. The pulse position modulation (PPM) optical communications system of claim 1 wherein the encoder is a programmable digital computer.

5. An optical pulse position modulation (PPM) receiver comprising:
 a splitter that splits a received series of delayed optical pulses Q(t) into an original series and a second series, wherein Q(t) represents an input signal U(t) encoded into a series of optical pulses delayed by a delay $\Delta(t)=bV(t)$, according to $V(t)=U(t)+aV(t-kT)$, where k is a positive integer and a and b are coefficients;
 a delay module that delays the second series by ckT to produce Q(t−ckT), wherein c is a positive coefficient;
 an optical pulse decoder receiving Q(t) and Q(t−ckT); and
 a photodetector receiving an output of the optical pulse decoder;
 wherein the optical pulse decoder comprises a semiconductor optical amplifier.

6. The optical pulse position modulation (PPM) receiver of claim 5 wherein the receiver further comprises a fixed output repeater.

7. A method of performing pulse position modulation (PPM) communications comprising:
 (i) generating equally-spaced optical pulses with a sampling period T;
 (ii) transforming an incoming waveform U(t) into a linear combination V(t) of U(t) and a delayed output V(t−kT) according to a rule $V(t)=U(t)+aV(t-kT)$, where k is a positive integer and a is a coefficient, V(t) is voltage generated by the encoder;
 (iii) delaying the optical pulses in proportion to the voltage V(t), such that $A(t)=bV(t)$, where b is another coefficient and where A(t) is the amount of delay and Q(t) is the delayed optical pulses;
 (iv) transmitting the delayed optical pulses;
 (v) receiving the delayed optical pulses;
 (vi) splitting the delayed optical pulses Q(t) into an original series and a second series;
 (vii) delaying the second series by ckT to produce, Q(t−ckT), wherein c is a positive coefficient;
 (viii) decoding the original series Q(t) and the second series Q(t−ckT) into a signal proportional to the incoming waveform U(t);
 wherein the decoding of the original series and the second series is performed by a semiconductor optical amplifier.

8. The method of claim 7 further comprising converting the decoded original series and the second series into an electrical signal.

\* \* \* \* \*